United States Patent
Otake et al.

(10) Patent No.: US 9,340,088 B2
(45) Date of Patent: May 17, 2016

(54) SUSPENSION DEVICE

(75) Inventors: Takafumi Otake, Kani (JP); Shinichi Hagidaira, Kani (JP); Osamu Miyatani, Kani (JP); Yasuhiro Ota, Kitanagoya (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 13/812,251

(22) PCT Filed: Oct. 28, 2011

(86) PCT No.: PCT/JP2011/074922
§ 371 (c)(1),
(2), (4) Date: Mar. 14, 2013

(87) PCT Pub. No.: WO2012/063657
PCT Pub. Date: May 18, 2012

(65) Prior Publication Data
US 2013/0197755 A1 Aug. 1, 2013

(30) Foreign Application Priority Data

Nov. 10, 2010 (JP) ................................. 2010-251490

(51) Int. Cl.
*B60G 17/016* (2006.01)
*B60G 23/00* (2006.01)
(Continued)

(52) U.S. Cl.
CPC ............ *B60G 17/0162* (2013.01); *B60G 17/08* (2013.01); *B60G 2400/102* (2013.01); *B60G 2400/104* (2013.01); *B60G 2400/41* (2013.01); *B60G 2500/10* (2013.01)

(58) Field of Classification Search
None
See application file for complete search history.

(56) References Cited

U.S. PATENT DOCUMENTS 4,652,010 A * 3/1987 Sugasawa .................. 280/5.511
5,130,926 A * 7/1992 Watanabe et al. ............... 701/37
(Continued)

FOREIGN PATENT DOCUMENTS

GB 2 281 722 A 3/1995
JP 4-166407 A 6/1992
(Continued)

OTHER PUBLICATIONS

Extended European Search Report issued on Mar. 6, 2014.

*Primary Examiner* — Jerrah Edwards
*Assistant Examiner* — Tommy Worden
(74) *Attorney, Agent, or Firm* — Rabin & Berdo, P.C.

(57) ABSTRACT

A suspension device includes damper interposed between vehicle body and wheel in vehicle and exerted damping force for suppressing vertical movements of vehicle body and wheel, damping force adjustment mechanism adjusts damping force, control device controls damping force adjustment mechanism, lateral acceleration detection unit detects an lateral acceleration acting on vehicle body, roll angular velocity detection unit detects roll angular velocity of vehicle body, and steering angular velocity detection unit detects steering angular velocity of steering wheel. The control device sets maximum damping force out of damping force calculated from steering angular velocity, damping force calculated from lateral acceleration and damping force calculated from roll angular velocity as steering initial stage additional damping force, calculates final damping force of damper using steering initial stage additional damping force and performs steering initial stage control of controlling damper when steering angular velocity exceeds predetermined dead band.

4 Claims, 5 Drawing Sheets

(51) Int. Cl.
*B62C 3/00* (2006.01)
*B62K 25/00* (2006.01)
*G06F 7/00* (2006.01)
*G06F 17/00* (2006.01)
*G06F 19/00* (2011.01)
*B60G 17/08* (2006.01)

(56) References Cited

U.S. PATENT DOCUMENTS

| | | | |
|---|---|---|---|
| 5,393,087 A * | 2/1995 | Taniguchi et al. | 280/6.158 |
| 5,513,108 A * | 4/1996 | Kishimoto et al. | 701/38 |
| 5,559,701 A * | 9/1996 | Shimizu et al. | 701/36 |
| 5,701,245 A * | 12/1997 | Ogawa et al. | 701/37 |
| 6,157,892 A * | 12/2000 | Hada et al. | 701/301 |
| 6,312,065 B1 * | 11/2001 | Freitag et al. | 303/187 |
| 6,366,841 B1 * | 4/2002 | Ohsaku | 701/37 |
| 6,571,176 B1 * | 5/2003 | Shinmura et al. | 701/301 |
| 2005/0080544 A1 * | 4/2005 | Suzuki et al. | 701/70 |
| 2005/0209750 A1 * | 9/2005 | Masamura et al. | 701/38 |
| 2006/0085112 A1 * | 4/2006 | Lu et al. | 701/38 |
| 2006/0089771 A1 * | 4/2006 | Messih et al. | 701/45 |
| 2007/0067080 A1 * | 3/2007 | Messih et al. | 701/37 |
| 2007/0124051 A1 * | 5/2007 | Fujita | 701/70 |
| 2008/0234896 A1 | 9/2008 | Kato et al. | |
| 2008/0281488 A1 | 11/2008 | Ryu et al. | |
| 2010/0106369 A1 * | 4/2010 | Lu et al. | 701/38 |
| 2012/0053791 A1 * | 3/2012 | Harada | 701/38 |

FOREIGN PATENT DOCUMENTS

| | | |
|---|---|---|
| JP | 6-048147 A | 2/1994 |
| JP | 6-219132 A | 8/1994 |
| JP | 8-142627 A | 6/1996 |
| JP | 2006-273221 A | 10/2006 |
| JP | 2009-262926 A | 11/2009 |

* cited by examiner

SUSPENSION DEVICE

TECHNICAL FIELD

The present invention relates to a suspension device.

BACKGROUND ART

JP1994-48147A discloses a suspension device. This suspension device includes dampers interposed between a body and wheels of a vehicle, actuators for adjusting damping forces generated by the dampers, a control device for controlling the actuators to control the damping forces generated by the dampers, spring upper acceleration sensors for detecting accelerations of spring upper members in a vertical direction, and a steering sensor for detecting a steering angle of a steering wheel.

This suspension device obtains a vertical speed of the spring upper member by integrating a vertical acceleration and calculates a bounce velocity, a pitching rate and a roll rate of the spring upper member. The suspension device also calculates a damping force to be generated by the damper by adding values obtained by multiplying these rates by proportional gains and causes the damper to generate the calculated damping force.

Further, this suspension device calculates a steering speed based on a rate of change of the steering angle and changes the value of the proportional gain, by which the roll rate is to be multiplied, according to this calculated steering speed to deal with a roll caused by sudden steering. That is, this suspension device increases the value of the proportional gain as the steering speed increases, whereby the roll of the vehicle body at the time of steering can be suppressed.

SUMMARY OF THE INVENTION

However, in the above suspension device, it is difficult to sufficiently suppress the roll of the vehicle body for the following reason.

This is because the above suspension device adopts a configuration of generating damping forces dependent on the roll rate in response to the roll of the vehicle body. In the case of steering the steering wheel, the roll rate is very small at an initial stage of steering since the roll occurs at a timing later than the steering of the steering wheel. Thus, in the above suspension device, it is difficult to increase the damping forces of the dampers with good responsiveness even if the proportional gain is adjusted based on the steering speed, with the result that the roll at the initial stage of steering cannot be sufficiently suppressed.

Although final damping forces to be generated by the dampers depend on the bounce velocity, the pitching rate and the roll rate in the above suspension device, the roll rate becomes almost 0 and the damping force of the damper becomes lowest, for example, when the vehicle is running straight, there is neither bouncing nor pitching, the vehicle body slowly swings to left and right and the damper generates a damping force only in response to the roll rate. Thus, the roll of the vehicle body is not sufficiently suppressed and lateral swinging movements of the vehicle body are not solved, thereby ride quality of the vehicle deteriorates.

An object of the present invention is to provide a suspension device capable of sufficiently suppressing a roll of a vehicle body at an initial stage of steering and improving ride quality of a vehicle by solving lateral swinging movements of the vehicle body.

According to one aspect of the present invention, a suspension device is provided which comprises a damper interposed between a vehicle body and a wheel in a vehicle and adapted to exert a damping force for suppressing relative movements of the vehicle body and the wheel in a vertical direction; a damping force adjustment mechanism capable of adjusting a damping force in the damper; a control device for controlling the damping force adjustment mechanism; a lateral acceleration detection unit for detecting an acceleration in a lateral direction of the vehicle acting on the vehicle body; a roll angular velocity detection unit for detecting a roll angular velocity of the vehicle body; and a steering angular velocity detection unit for detecting a steering angular velocity of a steering wheel in the vehicle; wherein the control device sets a maximum damping force out of a damping force calculated from the steering angular velocity, a damping force calculated from the acceleration in the lateral direction and a damping force calculated from the roll angular velocity as a steering initial stage additional damping force, calculates a final damping force to be generated by the damper using the steering initial stage additional damping force and performs a steering initial stage control of controlling the damper when the steering angular velocity exceeds a dead band.

According to the above aspect, by causing a damper to generate a damping force opposing a roll moment of a vehicle body in response to a steering speed of a steering wheel at an initial stage of steering, the damping force of the damper increases, following a roll, without delay. Thus, the roll of the vehicle body can be sufficiently suppressed.

The faster a steering angular velocity of the steering wheel, the larger the roll moment acting on the vehicle body B. Thus, by causing a damping force corresponding to this steering angular velocity to be generated, the roll of the vehicle body can be effectively suppressed.

Embodiments of the present invention and advantages thereof are described in detail below with reference to the accompanying drawings.

EMBODIMENTS OF THE INVENTION

Figure 1:
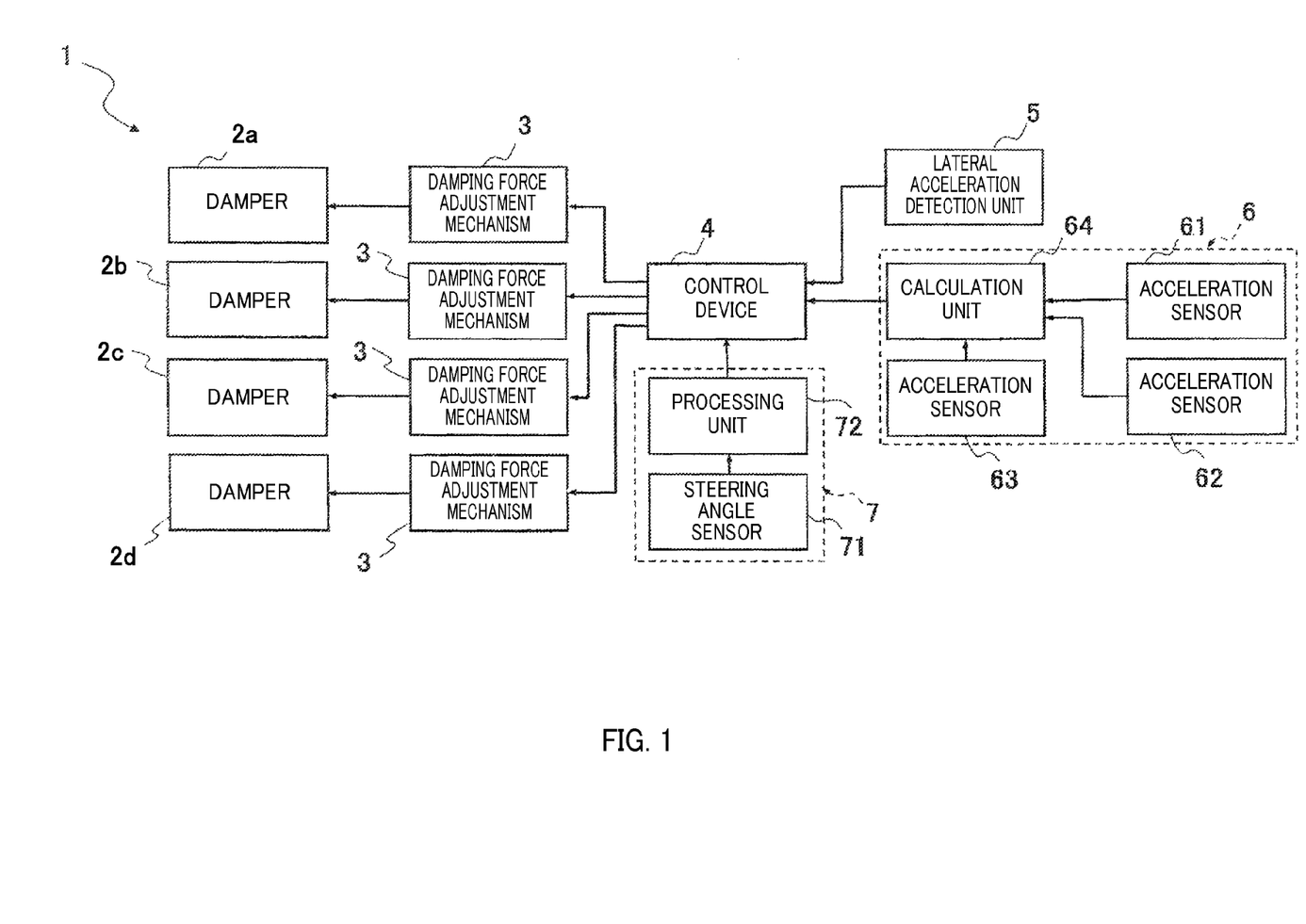
FIG. 1 is a system configuration diagram of a suspension device according to an embodiment of the present invention.
Figure 2:
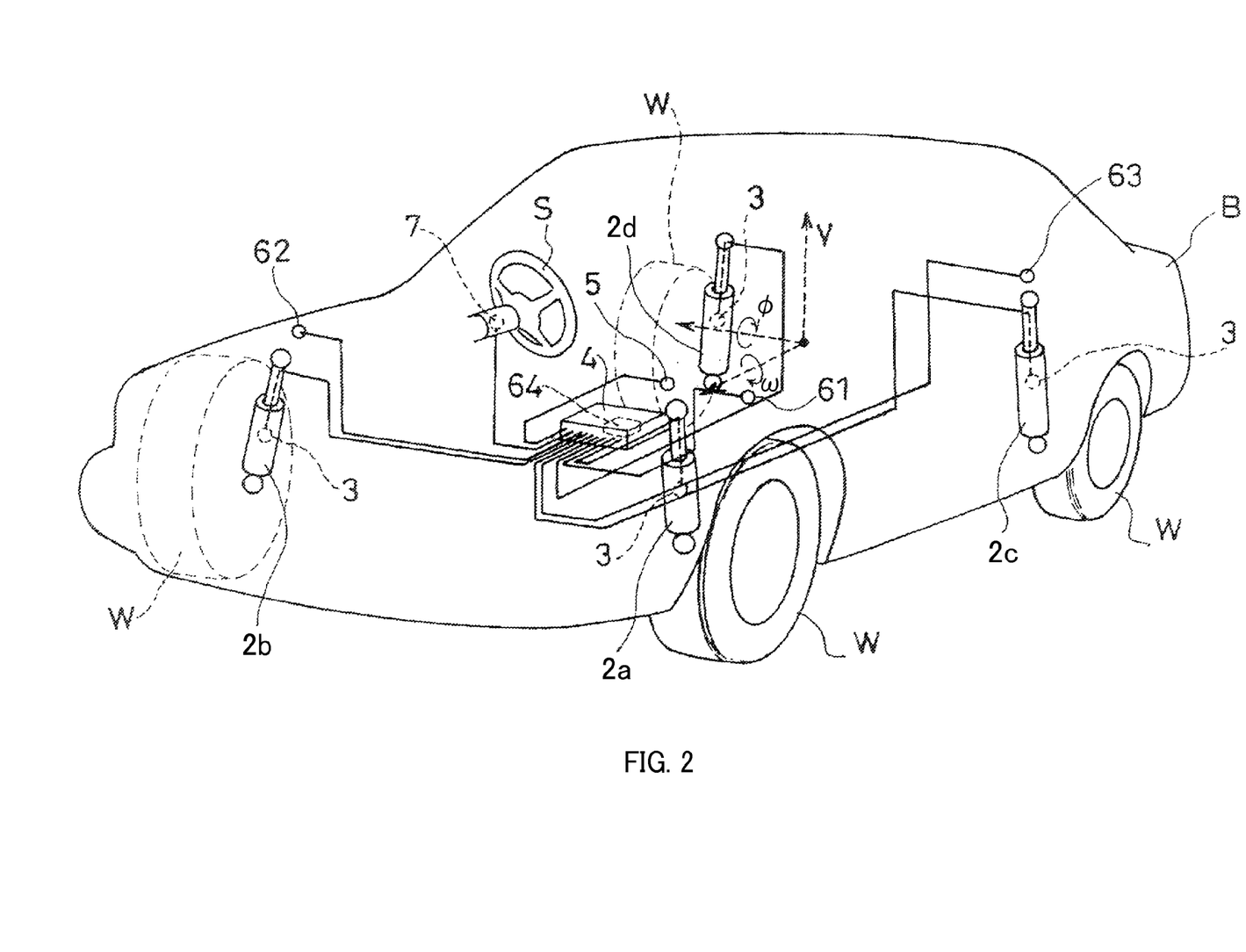
FIG. 2 is a configuration diagram showing a state where the suspension device according to the embodiment of the present invention is mounted in a vehicle.

As shown in FIGS. 1 and 2, a suspension device 1 according to this embodiment includes dampers 2a, 2b, 2c and 2d, damping force adjustment mechanisms 3, a control device 4, a lateral acceleration detection unit 5, a roll angular velocity detection unit 6 and a steering angular velocity detection unit 7.

The dampers 2a, 2b, 2c and 2d are interposed between a vehicle body B and wheels W of a vehicle and suppress relative movements of the vehicle body and the wheels in a vertical direction. The damping force adjustment mechanisms 3 can adjust damping forces in the dampers 2n (n=a, b, c, d; the same applies hereinafter). The control device 4 controls these damping force adjustment mechanisms 3. The lateral acceleration detection unit 5 detects an acceleration in a vehicle lateral direction acting on the vehicle body. The roll angular velocity detection unit 6 detects a roll angular velocity of the vehicle body. The steering angular velocity detection unit 7 detects a steering angular velocity of a steering wheel in the vehicle.

Figure 3:
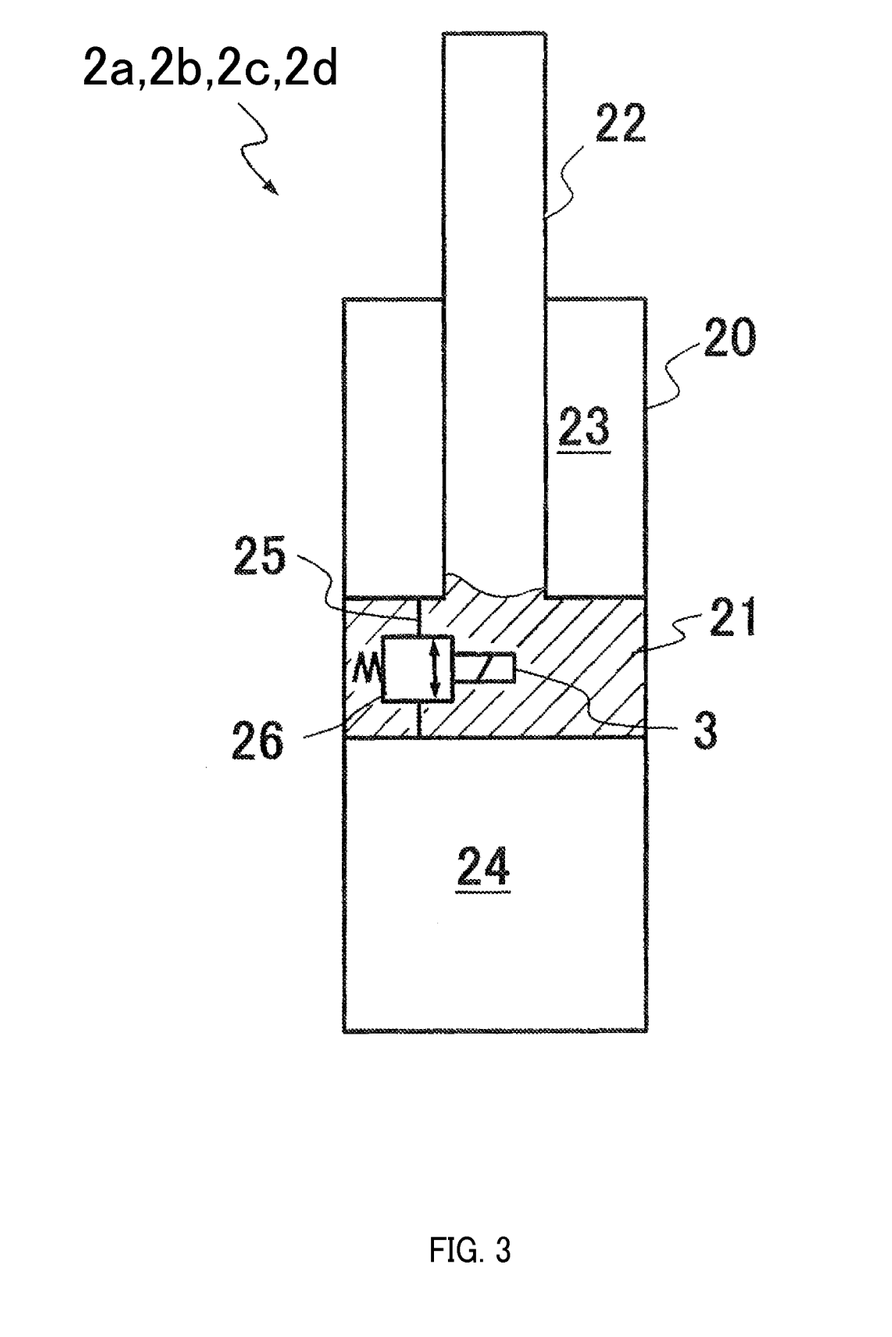
FIG. 3 is a diagram showing an example of a damper of the suspension device according to the embodiment of the present invention.

Hereinafter, each member is described in detail. As shown in FIG. 3, the damper 2n is a fluid pressure damper and includes a cylinder 20, a piston 21 slidably inserted into the cylinder 20, a piston rod 22 movably inserted into the cylinder 20 to be coupled to the piston 21, two pressure chambers 23, 24 partitioned by the piston 21 in the cylinder 20, a passage 25 allowing communication between the pressure chambers 23, 24, and a damping valve 26 provided at an intermediate position of the passage 25 and capable of changing a flow path area.

As shown in FIG. 2, the dampers 2n are interposed between the vehicle body B and the wheels W at four positions of the vehicle. The damper 2n causes a fluid filled in the pressure chambers 23, 24 to pass via the passage 25 and the damping valve 26 according to extension and contraction movements which are relative movements of the cylinder 20 and the piston rod 22 in an axial direction. The damper 2n applies resistance to the fluid at the damping valve 26 when the fluid in the pressure chambers 23, 24 passes along the passage 25, thereby exerting a damping force for suppressing the extension and contraction movements of the cylinder 20 and the piston rod 22 and suppressing relative movements of the vehicle body B and the wheel W in the vertical direction.

Besides hydraulic oil, water, aqueous solution, gas can be used as the fluid. When the fluid is a liquid and the damper 2n is a single-rod type damper, the damper 2n includes a gas chamber and a reservoir to compensate for the volume of the piston rod 22 projecting into and retracting from the cylinder 20. When the fluid is a gas, the gas chamber and the reservoir may not be provided.

If the damper 2n is of a uniflow type which includes a reservoir and in which the fluid is discharged from the interior of a cylinder 20 via a passage communicating with the reservoir, even where it extends and contracts, a damping valve may be provided at an intermediate position of the passage extending from the cylinder 20 to the reservoir and resistance may be applied to the flow of the fluid to exert a damping force.

The damping force adjustment mechanism 3 can adjust a flow path area and a valve opening pressure of the damping valve 26 by driving an unillustrated valve body in the damping valve 26 of the damper 2n. The damping force adjustment mechanism 3 is, for example, a solenoid or an actuator.

The above configuration of the damper 2n is an example. For example, when an electrorheological fluid or a magnetorheological fluid is filled in the pressure chambers 23, 24, a device for applying a voltage or a magnetic field may be mounted in the passage 25 instead of the damping valve 26. In this case, this device is the damping force adjustment mechanism 3 and the damper 2n can control a damping force to be generated by adjusting the magnitude of a voltage or a magnetic field in response to a command from the control device 4.

Besides the above, the damper 2n may be an electromagnetic damper which exerts a damping force for suppressing relative movements of a spring upper member and a spring lower member by an electromagnetic force. In this case, the electromagnetic damper may include, for example, a motor and a motion translating mechanism for translating rotational motion of the motor into linear motion or may be a linear motor. If the damper 2n is an electromagnetic damper in this way, a motor drive device for adjusting a current flowing in the above motor or linear motor functions as the damping force adjustment mechanism 3. The motion translating mechanism is, for example, a feed screw mechanism composed of a screw shaft and a ball screw nut threadably engaged with the screw shaft, or a rack and pinion.

As shown in FIG. 2, the lateral acceleration detection unit 5 is an acceleration sensor for detecting an acceleration in a lateral direction horizontal and perpendicular to a front-back direction of the vehicle body and can detect an acceleration in the lateral direction (hereinafter, referred to as a lateral acceleration G) acting on the vehicle. The lateral acceleration detection unit 5 is connected to the control device 4 and inputs the detected lateral acceleration G to the control device 4. Since a lateral acceleration caused by a centrifugal force acting at the time of rotation accounts for a large fraction of the lateral acceleration G, the lateral acceleration G can be estimated from the speed of the vehicle and an steering angle of a steering wheel S. The lateral acceleration detection unit 5 may calculate the lateral acceleration G by obtaining a vehicle speed pulse and the steering angle of the steering wheel S detected by a steering angle sensor 71 in the steering angular velocity detection unit 7 to be described later.

The roll angular velocity detection unit 6 includes acceleration sensors 61, 62 and 63 installed at arbitrary three positions which are not located on the same straight line extending in the front-back direction or the lateral direction of the vehicle body B and adapted to detect an acceleration in a vertical direction (hereinafter, referred to as a vertical acceleration) of the vehicle body B, and a calculation unit 64 to which the vertical acceleration detected by each of the acceleration sensors 61, 62 and 63 is inputted. The calculation unit 64 calculates a vertical bounce velocity (hereinafter, referred to as a bounce velocity V) of the vehicle body B, a roll angular velocity ω of the vehicle body B and a pitch angular velocity φ of the vehicle body B based on the three vertical accelerations and inputs calculation results to the control device 4.

More specifically, the bounce velocity V, the roll angular velocity ω and the pitch angular velocity φ that are three variables calculated by the calculation unit 64 are respectively a bounce velocity V, a roll angular velocity ω and a pitch angular velocity φ at the center of gravity of the vehicle body B. Three speeds in the vertical direction (hereinafter, referred to as vertical speeds) at the acceleration sensors 61, 62 and 63 can be obtained by integrating the vertical accelerations obtained by the acceleration sensors 61, 62 and 63. So, the bounce velocity V of the vehicle body B, the roll angular velocity ω of the vehicle body B and the pitch angular velocity φ of the vehicle body B at the center of gravity of the vehicle body B can be calculated from these three vertical speeds, the installation positions of the acceleration sensors 61, 62 and 63 in the vehicle body B known in advance and a center-of-gravity position of the vehicle body B if the vehicle body B is regarded as a rigid body.

Accordingly, the calculation unit 64 calculates the vertical speeds by integrating the vertical accelerations at the three positions and calculates the bounce velocity V of the vehicle body B, the roll angular velocity ω of the vehicle body B and the pitch angular velocity φ of the vehicle body B at the center of gravity of the vehicle body B from the vertical speeds at the three positions and distance and position relationships between the center of gravity of the vehicle body B and each of the acceleration sensors 61, 62 and 63. The calculation unit 64 may be integrated into the control device 4.

The calculation unit 64 in this embodiment calculates the bounce velocity V and the pitch angular velocity $\phi$ in addition to the roll angular velocity $\omega$ because the suspension device 1 of this embodiment controls the damping forces of the dampers 2n by performing a sky-hook control using the bounce velocity V, the roll angular velocity $\omega$ and the pitch angular velocity $\phi$. If the suspension device 1 does not perform the sky-hook control, the calculation unit 64 may calculate only the roll angular velocity $\omega$ without calculating the bounce velocity V and the pitch angular velocity $\phi$.

Since it is sufficient to obtain the vertical speeds of the vehicle body B right above the dampers 2n to perform the sky-hook control, an acceleration sensor for detecting an acceleration in the vertical direction may be provided at each of four positions of the vehicle body B, e.g. in either one of the cylinder 20 and the piston rod 22 where the damper 2n and the vehicle body B are coupled, and the bounce velocity V and the pitch angular velocity $\phi$ of the vehicle body B may not be calculated. However, since it is sufficient to provide three acceleration sensors in this embodiment, there is a cost advantage as compared with the case where four acceleration sensors are used as described above.

The steering angular velocity detection unit 7 for detecting a steering angular velocity of the steering wheel S in this vehicle includes the steering angle sensor 71 for detecting the steering angle of the steering wheel S and a processing unit 72 for calculating a steering angular velocity $\theta$ from the steering angle. The processing unit 72 may be an arithmetic device for differentiating the steering angle detected by the steering angle sensor 71 or may be a high-pass filter for processing a signal input from the steering angle sensor 71 to obtain a differentiation result of the steering angle. The steering angular velocity $\theta$ is input to the control device 4. The processing unit 72 may be integrated into the control device 4.

If the vehicle equipped with the control device 4 of the dampers 2n is equipped with a CAN (Controller Area Network) and the roll angular velocity $\omega$ and the steering angular velocity $\theta$ of the vehicle body B and parameters for obtaining these values are obtained via the CAN, the control device 4 may be connected to the CAN and may obtain the above roll angular velocity $\omega$ and steering angular velocity $\theta$ via the CAN.

The control device 4 obtains the lateral acceleration G from the lateral acceleration detection unit 5, the roll angular velocity $\omega$ from the roll angular velocity detection unit 6 and the steering angular velocity $\theta$ from the steering angular velocity detection unit 7 and determines an initial stage of steering if the steering angular velocity $\theta$ is beyond a predetermined dead band.

When judging the initial stage of steering, the control device 4 sets a maximum damping force out of a damping force F$\theta$ calculated from the steering angular velocity $\theta$, a damping force FG calculated from the lateral acceleration G and a damping force F$\omega$ calculated from the roll angular velocity $\omega$ as a steering initial stage additional damping force. The control device 4 calculates a final damping force Dn (n=a, b, c, d; the same applies hereinafter) to be generated by the damper 2n using the steering initial stage additional damping force and performs a steering initial stage control for controlling the damper 2n.

When not judging the initial stage of steering, the control device 4 sets the larger one of the damping force FG calculated from the lateral acceleration G and the damping force Ro calculated from the roll angular velocity $\omega$ as an outside steering initial stage additional damping force. The control device 4 calculates the final damping force Dn to be generated by the damper 2n using the outside steering initial stage additional damping force and performs an outside steering initial stage control for controlling the damper 2n.

The dead band is set at such a steering angular velocity of the steering wheel S that the vehicle body B does not undergo an unignorable roll. By this, when the steering angular velocity $\theta$ is within the dead band, the steering initial stage control is not performed. Thus, the damping force of the damper 2n becoming excessive due to the steering initial stage control and ride quality deteriorating despite the occurrence of only a slight roll can be prevented.

The control device 4 calculates a sky-hook damping force CSn (n=a, b, c, d; the same applies hereinafter) from the bounce velocity V, the roll angular velocity $\omega$ and the pitch angular velocity $\phi$ input from the calculation unit 64. The control device 4 calculates the final damping force Dn by adding the steering initial stage additional damping force to the sky-hook damping force CSn and causes the damper 2n to exert the final damping force Dn at the time of the steering initial stage control. The control device 4 calculates the final damping force Dn by adding the outside steering initial stage additional damping force to the sky-hook damping force CSn and causes the damper 2n to exert the final damping force Dn at the time of the outside steering initial stage control.

The control device 4 calculates the sky-hook damping force CSn of the damper 2n based on CSn=$\alpha$n·V+$\beta$n·$\omega$+$\gamma$n·$\phi$ (n=a, b, c, d; the same applies hereinafter). The $\alpha$ is a proportional gain for the bounce velocity, the $\beta$n is a proportional gain for the roll angular velocity and the $\gamma$n is a proportional gain for the pitch angular velocity, and they are respectively set at values suitable for each damper 2n.

At the time of the steering initial stage control, the final damping force Dn to be generated by the damper 2n is calculated by adding the largest one of the damping force F$\theta$ calculated from the steering angular velocity $\theta$, the damping force FG calculated from the lateral acceleration G and the damping force F$\omega$ calculated from the roll angular velocity $\omega$ as the steering initial stage additional damping force to the sky-hook damping force CSn.

The damping force F$\theta$ is calculated based on F$\theta$=k$\theta$·$\theta$, the damping force FG is calculated based on FG=kG·G and the damping force F$\omega$ is calculated based on F$\omega$=k$\omega$·$\omega$). The k$\theta$ is a proportional gain for the steering angular velocity $\theta$, the kG is a proportional gain for the lateral acceleration G and the k$\omega$ is a proportional gain for the roll angular velocity.

If the damping force F$\theta$ calculated from the steering angular velocity $\theta$ is larger than the other damping forces FG, F$\omega$ at the time of the steering initial stage control, the damping force F$\theta$ calculated from the steering angular velocity $\theta$ becomes the steering initial stage additional damping force, wherefore the final damping force Dn is calculated based on Dn=CSn+F$\theta$. Contrary to this, since the larger one of the damping force FG calculated from the lateral acceleration G and the damping force F$\omega$ calculated from the roll angular velocity $\omega$ is set as the outside steering initial stage additional damping force at the time of the outside steering initial stage control, the final damping force Dn is calculated by adding the sky-hook damping force CSn to the outside steering initial stage additional damping force. Accordingly, if the damping force F$\omega$ calculated from the roll angular velocity $\omega$ is larger than the other damping force FG at the time of the outside steering initial stage control, the damping force F$\omega$ becomes the outside steering initial stage additional damping force, wherefore the final damping force Dn is calculated based on Dn=CSn+F$\omega$.

Since the steering initial stage control is triggered by the steering angular velocity $\theta$ exceeding the dead band, ride quality deteriorating by exerting an excessive damping force in response to such steering of the steering wheel S that does not cause any roll can be prevented. In calculating the final damping force Dn, the damping force to which the steering initial stage additional damping force or the outside steering initial stage additional damping force should be added is not limited to the above sky-hook damping force.

As described above, the control device 4 calculates the final damping force Dn to be generated by the damper 2n from the lateral acceleration G, the bounce velocity V, the roll angular velocity ω, the pitch angular velocity φ and the steering angular velocity θ respectively detected by the lateral acceleration detection unit 5, the roll angular velocity detection unit 6 and the steering angular velocity detection unit 7 and outputs a command corresponding to the calculated damping force to the damping force adjustment mechanism 3. As hardware resources, the control device 4 includes, for example, an A/D converter for reading a signal output by the lateral acceleration detection unit 5, a storage device such as a ROM (Read Only Memory) for storing a program used for processings necessary for the controls, an arithmetic device such as a CPU (Central Processing unit) for performing the processings based on the above program, and a storage device such as a RAM (Random Access Memory) for providing a storage area to the above CPU. The CPU performs the above program to realize a control operation of the control device 4. When the roll angular velocity detection unit 6 and the steering angular velocity detection unit 7 output analog voltage signals, A/D converters for reading these signals may be provided.

Figure 4:
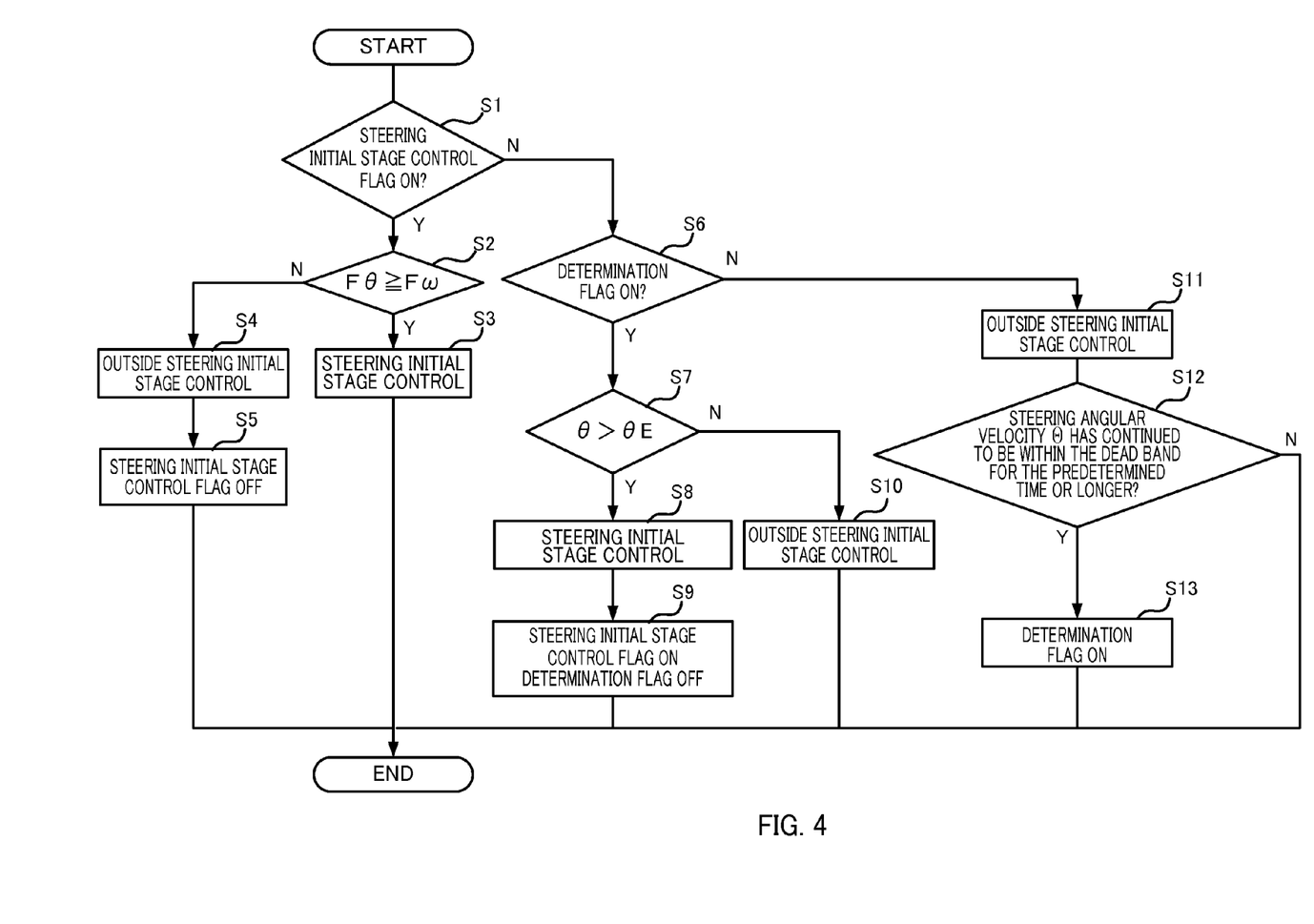
FIG. 4 is a flow chart showing a processing procedure of a control device in the suspension device according to the embodiment of the present invention.

FIG. 4 is a flow chart showing a control process of the dampers 2n in the control device 4.

In Step S1, the control device 4 determines whether or not a steering initial stage control is in process. Specifically, the control device 4 determines whether or not a steering initial stage control flag is ON. The control device 4 determines that the steering initial stage control is in process if the steering initial stage control flag is ON and determines that the outside steering initial stage control is in process if this flag is OFF. If the steering initial stage control flag is ON, the steering initial stage control is already in process and the process proceeds to Step S2.

In Step S2, the control device 4 determines whether or not the damping force Fθ obtained from the steering angular velocity θ is equal to or larger than the damping force Fω obtained from the roll angular velocity ω. If the damping force Fθ is equal to or larger than the damping force Fω, the process proceeds to Step S3 and the control device 4 continues the steering initial stage control.

In Step S3, the control device 4 calculates the final damping force Dn of each damper 2n by adding the steering initial stage additional damping force to the sky-hook damping force CSn. The control device 4 drives the damping force adjustment mechanism 3 to set the damping force generated by the damper 2n as the calculated final damping force Dn. The steering initial stage additional damping force is the largest one of the damping force Fθ calculated from the steering angular velocity θ, the damping force FG calculated from the lateral acceleration G and the damping force Fω calculated from the roll angular velocity ω as described above.

If the damping force Fθ is determined to be smaller than the damping force Fω in Step S2, i.e. if the damping force Fω is larger than the damping force Fθ, the process proceeds to Step S4.

In Step S4, the control device 4 has already passed the initial stage of steering and finishes the steering initial stage control and switches to the outside steering initial stage control since the damping force Fω is larger than the damping force Fθ. The outside steering initial stage control sets the larger one of the damping force FG calculated from the lateral acceleration G and the damping force Fω calculated from the roll angular velocity ω as the outside steering initial stage additional damping force and calculates the final damping force Dn by adding the sky-hook damping force CSn to the outside steering initial stage additional damping force. The control device 4 drives the damping force adjustment mechanism 3 to set the damping force generated by the damper 2n as the calculated final damping force Dn.

In Step S5, the control device 4 sets the steering initial stage control flag OFF since the steering initial stage control is already finished.

If the steering initial stage control flag is determined to be OFF in Step S1, the process proceeds to Step S6.

In Step S6, the control device 4 determines whether or not the steering angular velocity θ has continued to be within the dead band for a predetermined time or longer after the last steering initial stage control was finished. Specifically, the control device 4 determines whether or not a determination flag is ON. If the determination flag is ON, it indicates that the steering angular velocity θ has continued to be within the dead band for the predetermined time or longer after the last steering initial stage control was finished. If the determination flag is OFF, it indicates that the time during which the steering angular velocity θ has continued to be within the dead band after the last steering initial stage control was finished is shorter than the predetermined time. For example, if steering of the steering wheel S in one direction is one steering, this predetermined time is set at such a time as to enable a determination of the end of one steering and determined to be an optimal time from the type, weight and the like of the vehicle.

In Step S7, since the control device 4 is in a state to be able to start the steering initial stage control if the determination flag is ON and a start condition is right, it determines whether or not this start condition holds, i.e. whether or not the absolute value of the steering angular velocity θ is larger than θE which is a boundary of the dead band. If the absolute value of the steering angular velocity θ is larger than θE, the process proceeds to Step S8.

In Step S8, the control device 4 starts the steering initial stage control, calculates the final damping force Dn in accordance with the steering initial stage control and drives the damping force adjustment mechanism 3 to set the damping force generated by the damper 2n as the calculated final damping force Dn.

In Step S9, the control device 4 sets the steering initial stage control flag ON since the steering initial stage control has started and sets the determination flag OFF since the steering initial stage control has started anew.

If the absolute value of the steering angular velocity θ is determined to be equal to or smaller than θE in Step S7, the process proceeds to Step S10.

In Step S10, the control device 4 calculates the final damping force Dn in accordance with the outside steering initial stage control and drives the damping force adjustment mechanism 3 to set the damping force generated by the damper 2n as the calculated final damping force Dn since a condition to start the steering initial stage control is not met.

If the time during which the steering angular velocity θ has continued to be within the dead band after the last steering initial stage control was finished is determined to be shorter than the predetermined time in Step S6, the process proceeds to Step S11 and the control device 4 performs the outside steering initial stage control since the condition to start the steering initial stage control is not met.

In Step S12, the control device 4 determines whether or not the steering angular velocity θ has continued to be within the dead band for the predetermined time or longer after the last steering initial stage control was finished. If the steering angular velocity θ has continued to be within the dead band for the predetermined time or longer after the last steering initial stage control was finished, the process proceeds to Step S13 and the control device 4 sets the determination flag ON.

The control device 4 repeats the above procedure from Step S1 to Step S13 to control the damping force of the damper 2n.

Figure 5:
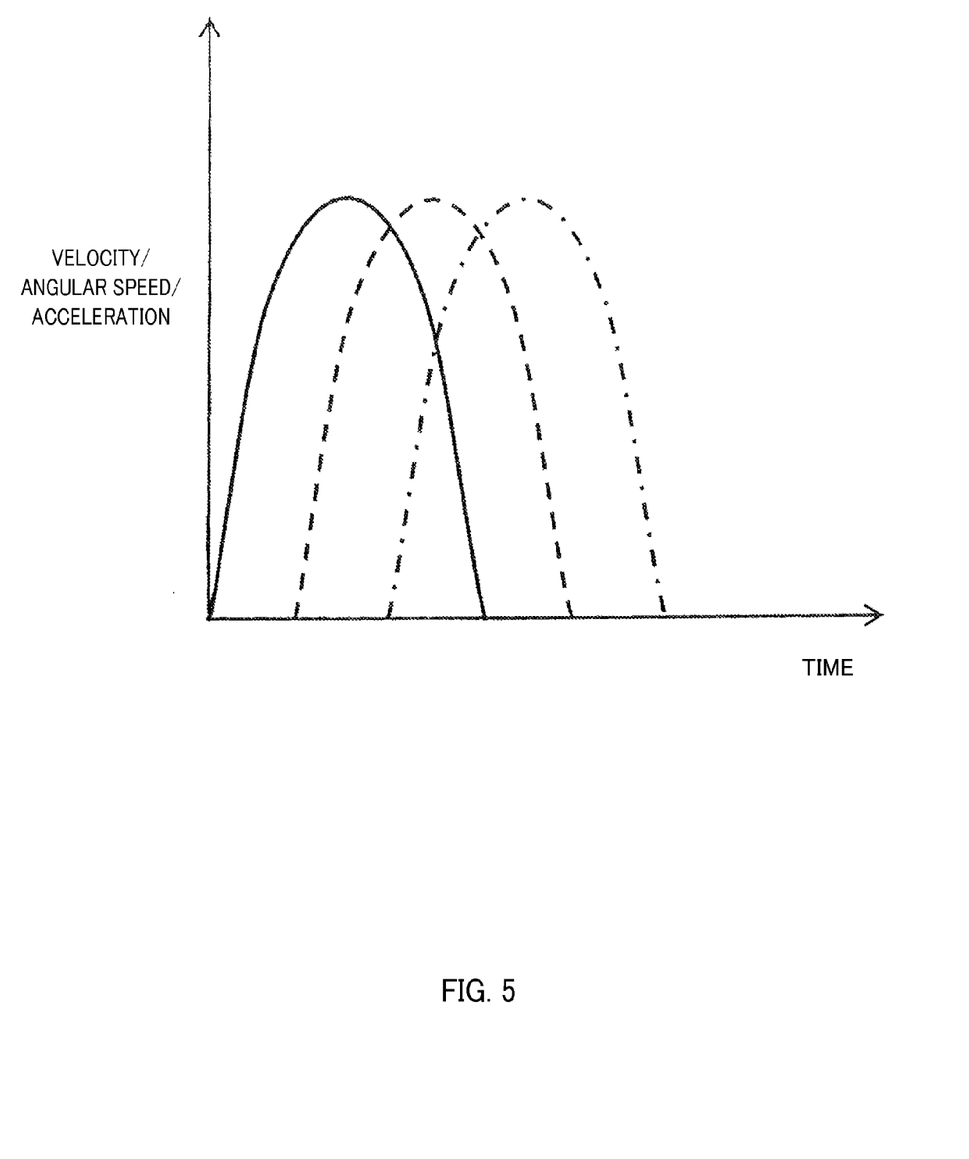
FIG. 5 is a diagram showing a correlation of a lateral acceleration, a roll and a steering angular velocity acting on the vehicle.

As shown in FIG. 5, in the case of steering the steering wheel S, there is a delay until a roll of the vehicle body B (broken line in FIG. 5) occurs and the lateral acceleration (dashed-dotted line in FIG. 5) acts before the steering angular velocity θ of the steering wheel S (solid line in FIG. 5) occurs. Contrary to this, the suspension device 1 of this embodiment causes the dampers 2n to generate damping forces opposing a roll moment of the vehicle body B in response to the steering angular velocity θ of the steering wheel S at the initial stage of steering, whereby the damping forces of the dampers 2n increase without lagging behind the roll. Thus, the roll of the vehicle body B can be sufficiently suppressed.

The faster the steering angular velocity θ of the steering wheel S, the steeper the steering of the steering wheel S and the larger the roll moment acting on the vehicle body B. The suspension device 1 of this embodiment can effectively suppress the roll of the vehicle body B by exerting damping forces corresponding to this steering angular velocity θ.

When the damping force Fω calculated from the roll angular velocity ω exceeds the damping force Fθ calculated from the steering angular velocity θ, the suspension device 1 finishes the steering initial stage control, proceeds to the outside steering initial stage control, sets the larger one of the damping force FG calculated from the lateral acceleration G and the damping force Fω calculated from the roll angular velocity ω as the outside steering initial stage additional damping force, and calculates the final damping force Dn using this outside steering initial stage additional damping force. Thus, even if the steering angular velocity θ decreases, the damping forces of the dampers 2n do not become excessively small as long as the vehicle is turning and the vehicle body B undergoes a roll and the lateral acceleration G. So, the roll of the vehicle body at the time of steering can reliably be suppressed.

When the vehicle is running straight, there is neither bouncing nor pitching and lateral swinging movements of the vehicle body B occur to slowly swing the vehicle body B to left and right, the suspension device 1 sets the larger one of the damping force FG calculated from the lateral acceleration G and the damping force Fω calculated from the roll angular velocity ω as the outside steering initial stage additional damping force and calculates the final damping force Dn. Thus, ride quality of the vehicle can be improved by effectively damping the above lateral swinging movements of the vehicle body B.

Since the dead band is provided for the steering angular velocity θ as the condition to proceed to the steering initial stage control in the suspension device 1, the steering initial stage control being performed and the damping forces of the dampers 2n becoming excessive to deteriorate ride quality despite the occurrence of only a slight roll of the vehicle body B can be prevented.

Since the steering initial stage control is not resumed in the suspension device 1 unless the steering angular velocity θ has continued to be within the dead band for the predetermined time or longer after the steering initial stage control was finished, the steering initial stage control being performed many times during the steering of the steering wheel S in one direction and the damping forces of the dampers 2n suddenly changing can be prevented.

The embodiments of the present invention described above are merely illustration of some application examples of the present invention and not of the nature to limit the technical scope of the present invention to the specific constructions of the above embodiments.

The present application claims a priority based on Japanese Patent Application No. 2010-251490 filed with the Japan Patent Office on Nov. 10, 2010, all the contents of which are hereby incorporated by reference.

INDUSTRIAL APPLICABILITY

This invention can be used for vibration suppression of vehicle such as dampers for vehicle.

The invention claimed is:

1. A suspension device, comprising:
   a damper interposed between a vehicle body and a wheel in a vehicle and adapted to exert a damping force for suppressing relative movements of the vehicle body and the wheel in a vertical direction;
   a damping force adjustment mechanism that adjusts a damping force in the damper;
   a control device for controlling the damping force adjustment mechanism based on inputs from at least a first sensor, a second sensor, a third sensor, and an internal clock;
   wherein the first sensor is a steering angular velocity detection unit for detecting a steering angular velocity of a steering wheel in the vehicle which is utilized by the control device to determine a first damping force calculated and to determine one or more plurality of times when the steering angular velocity of the steering wheel changes from being inside to outside or outside to inside of a predetermined dead band;
   wherein the second sensor is a lateral acceleration detection unit for detecting an acceleration in a lateral direction of the vehicle acting on the vehicle body which is utilized by the control device to determine a second damping force calculated;
   wherein the third sensor is a roll angular velocity detection unit for detecting a roll angular velocity of the vehicle body which is utilized by the control device to determine a third damping force calculated;
   during a steering initial stage control strategy the control device:
   sets a steering initial stage additional damping force to the maximum of at least the first damping force calculated, the second damping force calculated, and the third damping force calculated;
   calculates a final steering initial stage additional damping force to be generated by the damper using at least the steering initial stage additional damping force; and
   performs the steering initial stage control strategy of controlling the damper when the steering angular velocity exceeds a dead band until the third damping force calculated exceeds the first damping force calculated; and
   during an outside steering initial stage control strategy the control device:
   sets an outside steering initial stage additional damping force as the maximum of at least the second damping force calculated and the third damping force calculated;

calculates a final outside steering initial stage additional damping force to be generated by the damper using at least the outside steering initial stage additional damping force; and performs the outside steering initial stage control strategy of controlling the damper.

2. The suspension device according to claim 1, wherein the control device:

continues the outside steering initial stage control strategy without resuming the steering initial stage control strategy when a time during which the steering angular velocity has continued to be within a predetermined dead band after the steering initial stage control strategy was finished is shorter than a predetermined time.

3. The suspension device according to claim 1, wherein the control device:

utilizes the inputs of the first sensor, the second sensor and the third sensor to determine a bounce velocity of the vehicle body in the vertical direction which is utilized by the control device to determine a fourth damping force calculated; and a pitch angular velocity of the vehicle body which is utilized by the control device to determine a fifth damping force calculated;

calculates a sky-hook damping force based on the third damping force calculated, the fourth damping force calculated, and the fifth damping force calculated; and sets a final steering initial stage additional damping force based on at least the adding of a steering initial stage additional damping force and the sky-hook damping force.

4. The suspension device according to claim 3, wherein the control device:

sets a final outside steering initial stage additional damping force based on at least the adding of the outside steering initial stage additional damping force and the sky-hook damping force.

\* \* \* \* \*